United States Patent
Greim et al.

[11] Patent Number: 5,939,185
[45] Date of Patent: Aug. 17, 1999

[54] BEARING MATERIAL OF SILICON CARBIDE

[75] Inventors: Jochen Greim, Buchenberg; Hubert Thaler; Michael Fundus, both of Kempten, all of Germany

[73] Assignee: Elektroschmelzwerk Kempten GmbH, Munich, United Kingdom

[21] Appl. No.: 08/959,972

[22] Filed: Oct. 29, 1997

[30] Foreign Application Priority Data

Dec. 23, 1996 [DE] Germany ............................. 196 54 174

[51] Int. Cl.$^6$ ....................................................... B32B 5/16
[52] U.S. Cl. ........................... 428/331; 428/367; 428/401; 428/698; 501/84; 501/88; 501/89; 501/90; 501/92
[58] Field of Search ..................... 428/364, 367, 428/331, 401, 404, 688, 698; 501/84, 87, 88, 89, 90, 92

[56] References Cited

U.S. PATENT DOCUMENTS

| | | | |
|---|---|---|---|
| 4,230,497 | 10/1980 | Schwetz et al. | 106/44 |
| 5,545,597 | 8/1996 | Yeckley | 501/98 |
| 5,776,600 | 7/1998 | Katayama et al. | 428/325 |

FOREIGN PATENT DOCUMENTS

| | | |
|---|---|---|
| 0685437 | 12/1995 | European Pat. Off. . |
| 0709352 | 5/1996 | European Pat. Off. . |

OTHER PUBLICATIONS

Proc. 10th Int. Pumps Users Symposium, pp. 63–69.
U.S. application No. 08/544,308, Mossner et al., filed Oct. 17, 1995.
U.S. application No. 08/437,026, Schwetz et al., filed May 8, 1995.

*Primary Examiner*—Elizabeth Evans
*Attorney, Agent, or Firm*—Burgess, Ryan & Wayne

[57] ABSTRACT

A bearing material of silicon carbide particularly useful for application in the hot water field is provided having improved corrosion resistance under increased thermal stresses wherein the bearing material is characterized by a predominantly course-grained silicon carbide matrix of pressureless sintered silicon carbide having a biamodal grain sized distribution wherein the biomodal grain size distribution is formed by from 50 to 90% by volume of prismatic, tabular, silicon carbide crystallites having a length of from 100 to 1500 $\mu$m and from 10 to 50% by volume of prismatic tabular silicon carbide crystallites having a length of from 5 to <100 $\mu$m.

16 Claims, 6 Drawing Sheets

20x ⊢——⊣ 500 μm

500x ⊢——⊣ 20 μm

BEARING MATERIAL OF SILICON CARBIDE

BACKGROUND OF THE INVENTION

1.) Field of the Invention

The invention relates to bearing materials of silicon carbide, a process for their production and their use.

2.) Background Art

Dense sintered SiC has a high hardness, high-temperature strength, high thermal conductivity, thermal shock resistance, oxidation resistance as well as high abrasion and corrosion resistance. It also displays very good tribological behavior, by which is meant the frictional and wear behavior with and without lubrication. For this reason, sintered pure SiC has become established as an almost ideal material for sliding bearings subject to wear, in particular rotating mechanical seals, and is displacing other materials such as aluminum oxide or cemented carbide in these applications. Thus, rotating mechanical seals and sliding bearings made of sintered silicon carbide (SSiC) have been successfully used since the end of the 1970s in pumps which are subject to high corrosive and abrasive wear stresses. Dense sintered SiC has a purity of $\geq 98.5\%$ by weight of SiC and has a sintered density of typically 3.10–3.16 g/cm$^3$, corresponding to a residual porosity of 1–3% by volume. Thanks to its high hardness (Knoop $HK_{0.1}$=2500) and strength (flexural strength: about 400 MN/m$^2$), sintered SiC is exceptionally resistant to wear by solid particles which are entrained in liquid media. Even in the case of combined abrasive and corrosive wear, this ceramic material maintains its resistance.

Owing to the universal corrosion resistance, the exceptional wear resistance and the good tribological properties, many bearing and seal problems have been able to be solved using densely sintered SiC (commercially available, for example, from Elektroschmelzwerk Kempten under the name EKasic®D). This material is described, for example, in proc. 10th Int. Pumps Users Symposium, pp. 63–69. In the case of hermetically sealed pumps too, which are becoming increasingly important in the context of strict environmental regulations, the breakthrough came only with media-lubricated sliding bearings made of SSiC.

Many of the sliding wear problems which nevertheless occur in practice are attributable to interruption of ideal, i.e. properly lubricated, running conditions. In such a case, the sliding surfaces of the bearings or seals concerned come into contact with one another resulting in solid-to-solid or dry friction which is shown by a great increase in the coefficient of friction and leads to temperature peaks.

For applications under severe hydrodynamic conditions, material modifications which, as a result of appropriate configuration of the functional surfaces, continue to ensure sufficient stabilization of the hydrodynamic lubricating film even under short-term running conditions of mixed friction and dry running are known:

Elektroschmelzwerk Kempten GmbH (ESK) offers an SiC material having specifically introduced pores (mean pore size about 40 µm) under the name Ekasic® Tribo 2000. In this material, the pores act as microscopic lubricating pockets in the sliding surface. In the case of a brief breakdown of the hydrodynamic lubricating film, they continue to make some residual lubrication possible.

Furthermore, ESK offers an SiC material containing specifically introduced pores and graphite particles (mean particle size about 60 µm) under the name Ekasic® Tribo 2000-1. This material displays a distinctly improved running behavior in dynamic rotating mechanical seals having a hard/hard pairing (SiC against SiC) which run under mix and limited friction conditions at high pressure differences.

Materials having specifically introduced pores are described in EP-A-685437. Materials containing coarse graphite particles are described in EP 709352.

Although the known SiC material modifications can provide a successful solution for many applications in the field of bearings and seals, time and again there are critical applications, particularly in the hot water field, where corrosion can occur on the sliding surfaces even in the case of sintered SiC materials.

Applications in the hot water field are, for example, rotating mechanical seals having a hard/soft pairing (SiC against graphite) of a hard/hard pairing (SiC against SiC) for heating and power station pumps under the following use conditions: temperature of the medium: preferably from 50 to 200° C., particularly preferably 60–150° C., pressure difference: preferably 2–20 bar, particularly preferably 5–10 bar, sliding speed: preferably from 2 to 20 m/s, particularly preferably <10 m/s.

In the case of high sliding speeds and unfavorable running conditions, short-term dry running with local temperature peaks of >200° C. in the sliding surfaces can occur, for example, in a rotating mechanical seal. Owing to the good thermal conductivity of SiC, these high temperatures are only reached for a short time in regions close to the surface (hot spots), but these temperature peaks can nevertheless lead to grain boundary corrosion to a depth of about 20 µm. If the SiC microstructure is fine-grained, by which is meant an SiC microstructure having a grain size of <20 µm, tribochemical reactions in the sealing gap can occur in these regions via crystallite pull-out and these can then lead to formation of an SiO$_2$ layer on the sliding surfaces. These white layers, which are sometimes visible to the naked eye, can alter the sealing geometry until the seal fails.

Although dense, sintered SiC generally copes better with such situations than do other ceramics, there is a need for further-developed SiC bearing materials, particularly for applications in the hot water field.

It is therefore an object of the invention to improve the corrosion resistance in aqueous media under increased thermal stresses.

SUMMARY OF THE INVENTION

This object is achieved according to the invention by a bearing material having a predominantly coarse-grained SiC matrix of pressureless sintered SiC having a bimodal grain size distribution, wherein the bimodal grain size distribution is formed by from 50 to 90% by volume of prismatic, tabular SiC crystallites having a length of from 100 to 1500 µm and from 10 to 50% by volume of prismatic, tabular SiC crystallites having a length of from 5 to <100 µm.

While conventional efforts to optimize the microstructure are directed as producing a homogeneous fine-grained microstructure in the SiC bearing material, in the SiC bearing material of the invention, the proportion of grain boundaries is minimized by deliberate coarsening of the microstructure. In the bearing material of the invention, the large SiC crystallites close to the surface are anchored deep in the microstructure which is not influenced by grain boundary corrosion. This reduces corrosive attack which, particularly under elevated thermal stress, proceeds via the grain boundaries. Owing to the deep anchoring (up to about 1500 µm) of the individual crystallites in the matrix, the corrosive attack loses its damaging action on the sliding surfaces. The probability of grain pull-out is thus significantly reduced and a function-impairing layer formation on the sliding surfaces does not occur.

DESCRIPTION OF THE PREFERRED EMBODIMENTS

The bimodal grain size distribution is preferably formed by from 60 to 90% by volume of prismatic, tabular SiC crystallites having a length of from 100 to 1500 µm and from 10 to 40% by volume of prismatic, tabular SiC crystallites having a length of from 5 to <100 µm.

The SiC bearing material of the invention preferably comprises α-SiC. As sintering aid, it preferably contains up to 2% by weight of aluminum and/or boron. It can additionally contain up to 5% by weight of carbon in the form of carbon black and/or graphite. The graphite can be in particulate form. In particulate form, it preferably has a particle size of about 60 µm.

The material of the invention can be dense or porous with a closed porosity of up to 10% by volume. In the case of porous SiC having closed porosity, the mean pore size is preferably about 40 µm.

Preferably, the residual porosity in dense, pressureless-sintered SiC is 1–3% by volume and in porous SiC having closed porosity, it is 4–6% by volume.

The SiC bearing materials of the invention can be produced by methods known in principle in the prior art.

The SiC starting powder used for producing the SiC bearing materials of the invention is advantageously commercial α-SiC having a particle size distribution of <5 µm, preferably <3 µm, and a specific surface area of 10–15 m$^2$/g (measured by the BET method) and a purity of at least 99.5% by weight, based on the metallic impurities.

To produce the material of the invention, the SiC starting powder doped with the sintering aids is, for example, processed in a manner known per se together with up to 7% by weight of customary pressing aids to form a slip and is subsequently processed in an appropriate manner, for example, by spray drying the prepared slip, to give a free-flowing granular material. In addition, customary amounts of pore-forming materials can be added in a manner known per se. In this respect, for example, EP-A-685437, p. 5, lines 9 to 38, is incorporated by reference. Graphite particles can also be introduced in customary amounts in a known manner. In this respect, for example, EP 709352 is incorporated by reference.

Suitable sintering aids are, for example, elemental carbon, elemental aluminum, elemental boron, aluminum nitride and boron carbide; elemental carbon in the form of particulate graphite or carbon black and amorphous boron have been found to be particularly useful.

Suitable pressing aids are, for example, polyvinyl alcohol, polyvinyl acetate, aluminum stearate, polyacrylate, polyether and sugar. As pressing aid, use is advantageously made of polyvinyl alcohol which is obtainable under the name Polyviol from Wacker-Chemie GmbH, Munich, together with sugar (sucrose).

The ready-to-press mixture is subsequently shaped by pressing, for example, by axial die pressing or isostatic pressing, to form green bodies. The pressed shaped bodies are subjected to heat treatment for from 10 to 24 hours at temperatures in the range from 100 to 1000° C. in the presence of an inert atmosphere in order to remove the pressing aids and to pyrolize any pore-forming additives which may be present. The preheated shaped bodies are subsequently sintered at a sintering temperature of 2040° C.–2090° C., preferably in the presence of a protective gas atmosphere or under reduced pressure (30–800 mbar), for from 20 to 60 minutes to a high density (3.14–3.19 g/cm$^3$) with a fine-grained microstructure. They are subsequently heat treated under the above-mentioned atmosphere conditions at a grain growth temperature of 2100° C.–2220° C. for 20–60 min. until the SiC bearing materials of the invention are formed.

The SiC bearing materials of the invention can be used as sealing rings in axial rotating mechanical seals in the hard/hard and hard/soft pairings, preferably in the hard/hard pairing. They are also suitable for producing protective sleeves on shafts and components for sliding bearings whose resistance and reliability under elevated thermal stresses are to be improved.

In particular, the bearing materials of the invention are suitable for tribological applications in aqueous media under high thermal stress. Such applications are, for example, rotating mechanical seals and sliding bearings in the hard/hard and hard/soft pairings for chemical, heating and power station pumps.

The bearing materials of the present invention are preferably used in rotating mechanical seals in the hard/hard pairing for pumps, in particular heating and power station pumps, under hot water conditions.

FIG. 1 shows a characteristic, bimodal platelet microstructure of the SiC bearing material of the invention as described in Example 1 at magnifications of 20× (top right), 200× (top left) and 1000× (bottom).

FIG. 2 schematically shows the damage process on a conventional SiC rotating mechanical seal at elevated thermal stress. FIG. 2 depicts a conventional rotating mechanical seal with sliding ring (1) and counter ring (2) of fine-grained SiC having a grain size of 95% by volume <5 µm. The crystallites loosened by grain boundary corrosion (3) to a maximum depth of about 20 µm are, during use at elevated thermal stress, forced into the sealing gap (4) and ground very finely. Tribochemical reactions then result in the formation of function-impairing SiO$_2$ layers.

FIG. 3 schematically shows how the conventional damage process is avoided by means of the material of the invention. FIG. 3 depicts a rotating mechanical seal with sliding ring (5) and counter ring (6) of the coarse-grained SiC of the invention having a bimodal platelet microstructure. As a result of the deep, three-dimensional anchoring of the SiC plates in the matrix, which cannot be depicted in the two-dimensional sketch, there is no crystallite pull-out and thus also no tribochemical reactions with SiO$_2$ layer formation on the sliding surfaces despite grain boundary corrosion (7) to a maximum depth of about 20 µm. The crystallites shown in two dimensions in FIG. 3a enlargement (7), are in reality three-dimensionally anchored in the matrix beyond the corrosion depth.

Figure 1:
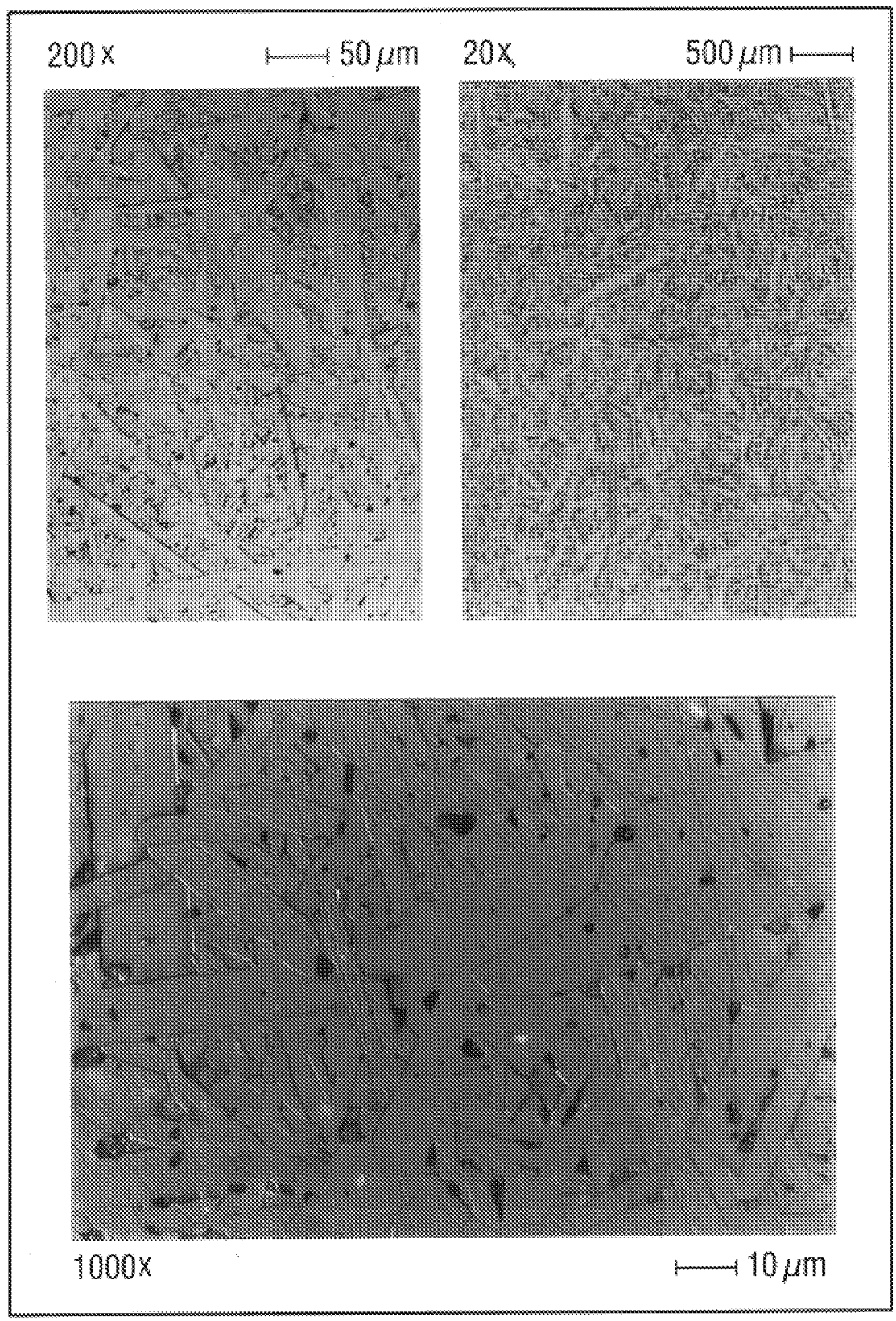

The following examples serve to illustrate the invention:

EXAMPLE 1

Production of sliding and counter ring of a material according to the invention.

The starting material used was fine, sinterable $\mu$-SiC powder having a mean particle size of 0.6 αm and a specific surface area of 12 m² per gram. The residual oxygen content was 0.6% by weight. An aqueous slip was prepared according to the following formulation:

| Sinterable α-SiC powder | 99.6 | Parts by weight (pbw) |
|---|---|---|
| Boron addition | 0.4 | pbw |
|  | 100.0 | pbw |
| Pressing aids: |  |  |
| sugar | 3.5 | pbw |
| Polyviol | 2.0 | pbw |

Firstly, a 60% strength dispersion of the SiC powder in water in which the doping and pressing aids have previously been dispersed or dissolved was prepared while stirring. The density was adjusted to 1600 g/l by addition of water and the slip thus prepared was dried under standard conditions by means of a spray drier.

The free-flowing pressable powder obtained was finally processed by die pressing in an automatic dry press under a pressure of 100 MPa to form sliding and counter rings having a pressed density of 1.84 g/cm³ and approximate dimensions of OD=88 mm, ID=66 mm, H=28 mm. The pressed parts were then preheated at 800° C. under a stream of argon for 24 hours in a chamber furnace to gently remove the lubricants and binders and to slowly pyrolize the organic carbon black formers.

After cooling the binder-free sliding rings to room temperature, they were sintered for 30 minutes at 2080° C. and a reduced pressure of 600 mbar to a density of 3.17 g/cm³ in graphite crucibles which were placed in the heating zone of a graphite tube furnace. This was followed by a heat-treatment phase at a grain growth temperature of 2155° C. and a hold time of 40 min. under argon. The sintered bodies experienced an 18% linear shrinkage based on the diameter of the rings and had an average sintered density of 3.17 g/cm³, corresponding to a total porosity of 1.0% by volume.

EXAMPLE 2

Production of further sliding and counter rings of material according to the invention.

The starting material used was fine, sinterable α-SiC powder having a mean particle size of 0.6 $\mu$m and a specific surface area of 12 m² per gram. The residual oxygen content was 0.6% by weight. An aqueous slip was prepared according to the following formulation:

| Sinterable α-SiC powder | 99.0 | Parts by weight (pbw) |
|---|---|---|
| Boron addition | 0.5 | pbw |
| Carbon black agglomerates (45–80 $\mu$m) | 0.5 | pbw |
|  | 100.0 | pbw |
| Pressing aids: |  |  |
| sugar | 3.5 | pbw |
| Polyviol | 2.0 | pbw |

Firstly, a 60% strength dispersion of the SiC powder in water in which the doping and pressing aids have previously been dispersed or dissolved was prepared while stirring. The density was adjusted to 1600 g/l by addition of water and the slip thus prepared was dried under standard conditions by means of a spray drier.

The free-flowing pressable powder obtained was finally processed by die pressing in an automatic dry press under a pressure of 100 MPa to form sliding and counter rings having a pressed density of 1.79 g/cm³ and approximate dimensions of OD=88 mm, ID=66 mm, H=28 mm. The pressed parts were then preheated at 800° C. under a stream of argon for 24 hours in a chamber furnace to gently remove the lubricants and binders and to slowly pyrolize the organic carbon black formers.

After cooling the binder-free sliding rings to room temperature, they were sintered in graphite crucibles which were placed in the heating zone of a graphite tube furnace under the same sintering and heat-treatment conditions as in Example 1. The sintered bodies experienced an 18% linear shrinkage based on the diameter of the rings and had an average sintered density of 3.14 g/cm³, corresponding to a total porosity of 1.5% by volume.

EXAMPLE 3

Production of sliding and counter rings of conventional, fine-grained SiC.

The starting material used was fine, sinterable α-Sic powder having a mean particle size of 0.6 $\mu$m and a specific surface area of 12 m² per gram. The residual oxygen content was 0.6% by weight. An aqueous slip was prepared according to the following formulation:

| Sinterable α-SiC powder | 98.5 | Parts by weight (pbw) |
|---|---|---|
| Boron addition | 0.5 | pbw |
| Carbon black | 1.0 | pbw |
|  | 100.0 | pbw |
| Pressing aids: |  |  |
| sugar | 3.0 | pbw |
| Polyviol | 2.0 | pbw |

Firstly, a 60% strength dispersion of the SiC powder in water in which the doping and pressing aids have previously been dispersed or dissolved was prepared while stirring. The density was adjusted to 1600 g/l by addition of water and the slip thus prepared was dried under standard conditions by means of a spray drier.

The free-flowing pressable powder obtained was finally processed by die pressing in an automatic dry press under a pressure of 100 MPa to form sliding and counter rings having a pressed density of 1.82 g/cm³ and approximate dimensions of OD=88 mm, ID=66 mm, H=28 mm. The pressed parts were then preheated at 800° C. under a stream of argon for 24 hours in a chamber furnace to gently remove the lubricants and binders and to slowly pyrolize the organic carbon black formers.

After cooling the binder-free sliding rings to room temperature, they were sintered for 30 minutes at 2030° C. and a reduced pressure of 600 mbar in graphite crucibles which were placed in the heating zone of a graphite tube furnace. The sintered bodies experienced a 17.5% linear shrinkage based on the diameter of the rings and had an average sintered density of 3.15 g/cm$^3$, corresponding to a total porosity of 1.3% by volume.

EXAMPLE 4:

Results of testing the sliding rings on a test bench.

The faces of the sliding rings from Examples 1 and 3 were lapped in a customary manner to the required final dimensions using a loose diamond grit of <20 μm and these rings were used as test rings. The tests were carried out on a rotating mechanical seal test bench (from Burgmann) under the following conditions:

Pressure difference: 6 bar
Sliding speed: 8 m/s
Running time: 500 hours
Temperature of the medium: deionized water, 60° C.

The effects of the grain boundary corrosion were assessed ceramographically by means of optical microscopy. Assessment of the sliding rings of the present invention as described in Example 1.

Figure 3:
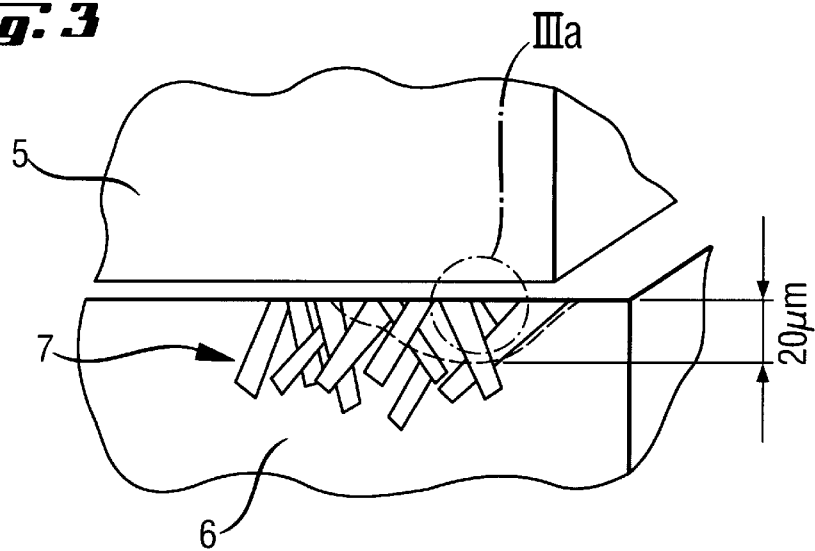
Figure 3A:
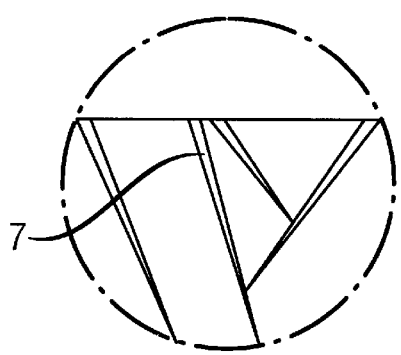
Figure 4:
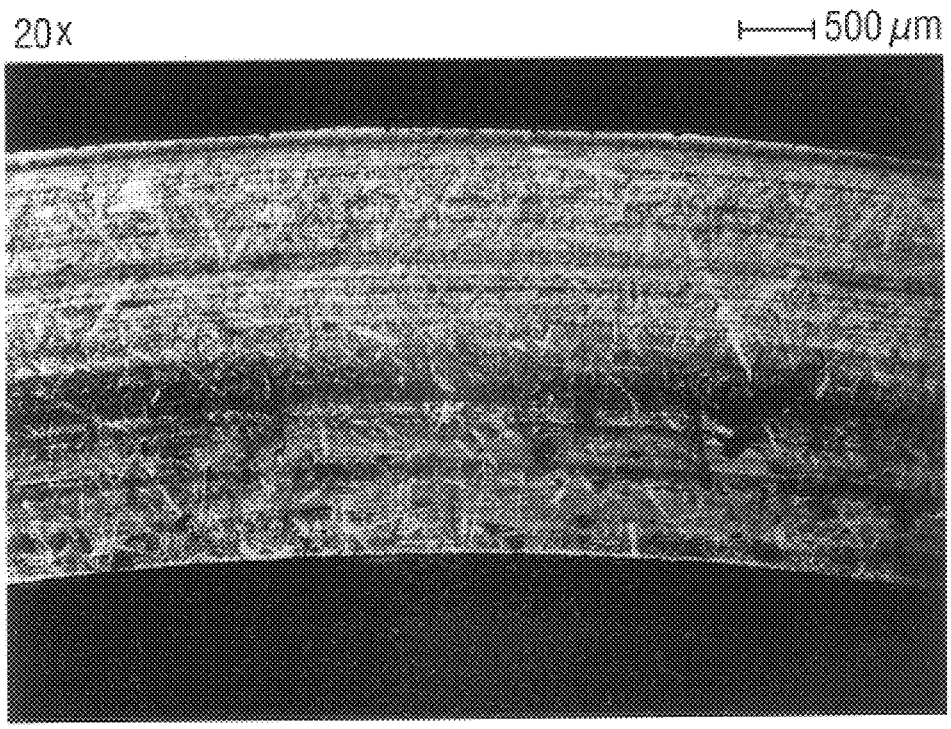
FIG. 4 shows the sliding surface of a sliding ring according to the invention after the test bench run of 500 hours as described in Example 4. (magnification: 20×)
Figure 5:
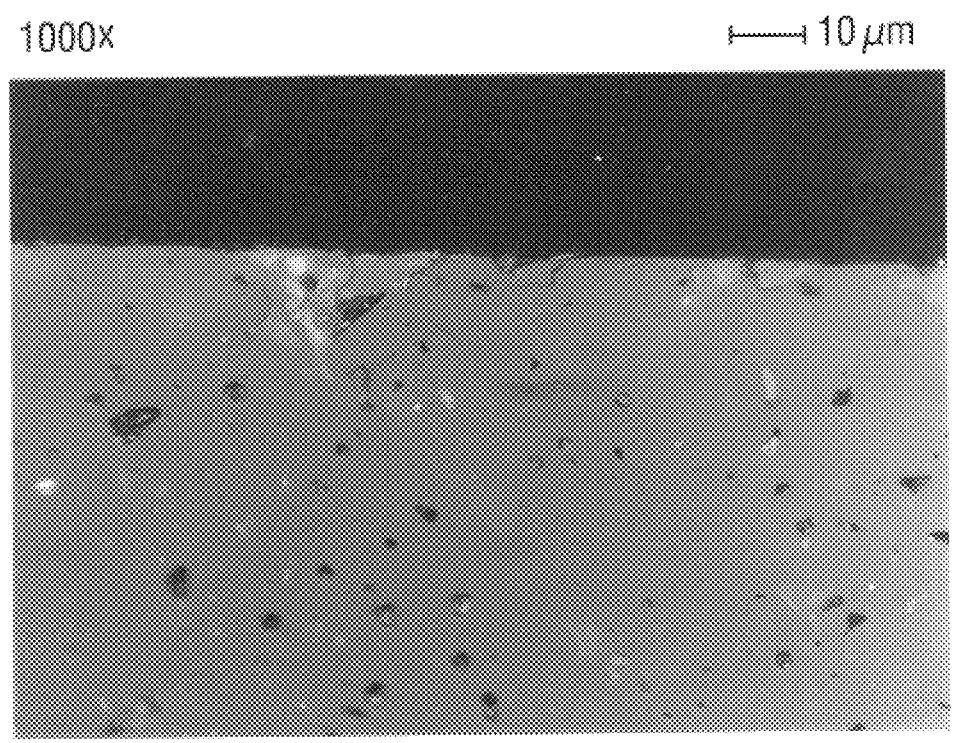
FIG. 5 shows a perpendicular section through the sliding surface of the sliding ring from FIG. 4. (Magnification: 1000×)

As FIG. 4 shows, the coarse-grained platelet structure can also be clearly recognized in the sliding surface after the test bench run. Although, as depicted in FIG. 5 (perpendicular section through the sliding surface), corrosion along the grain boundaries took place, no individual crystallites had been pulled out owing to the deep anchoring of the SiC plates in the matrix and thus no SiO$_2$ layer formation on the sliding surface had been able to take place (cf. schematic depiction in FIG. 3). Assessment of the conventional, fine-grained SiC bearing material as described in Example 3.

Figure 2:
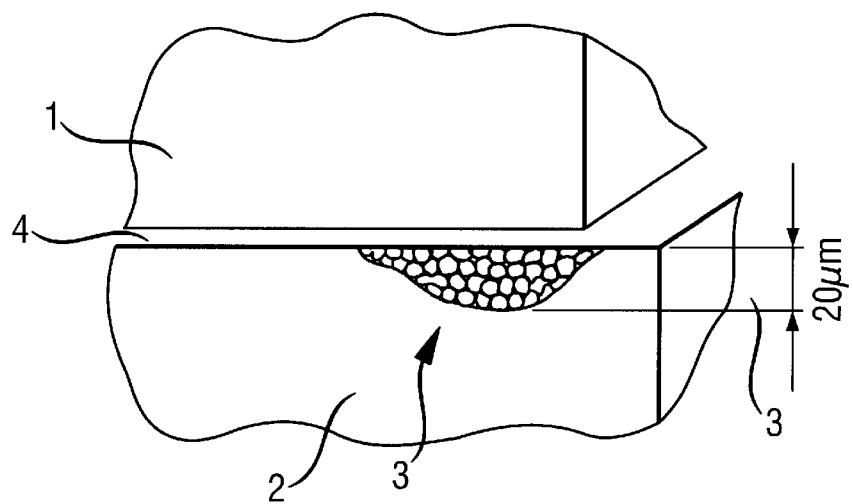
Figure 6:
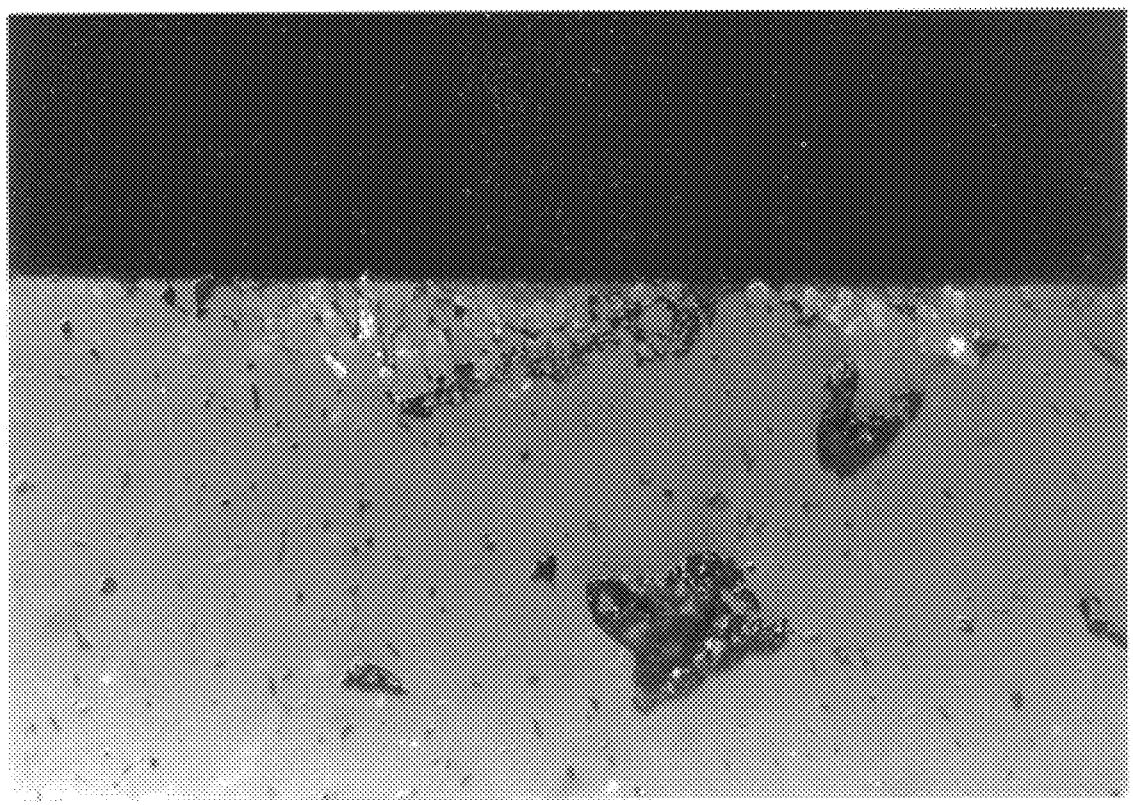
FIG. 6 shows the sliding surface of a sliding ring known from the prior art after the test bench run of 248 hours as described in Example 4. (Magnification: 1000×)
Figure 7:
FIG. 7 shows the SiO$_2$ layer formation on the sliding surface of a sliding ring known from the prior art after the test bench run of 500 hours as described in Example 4. (Magnification: 20×)
Figure 8:
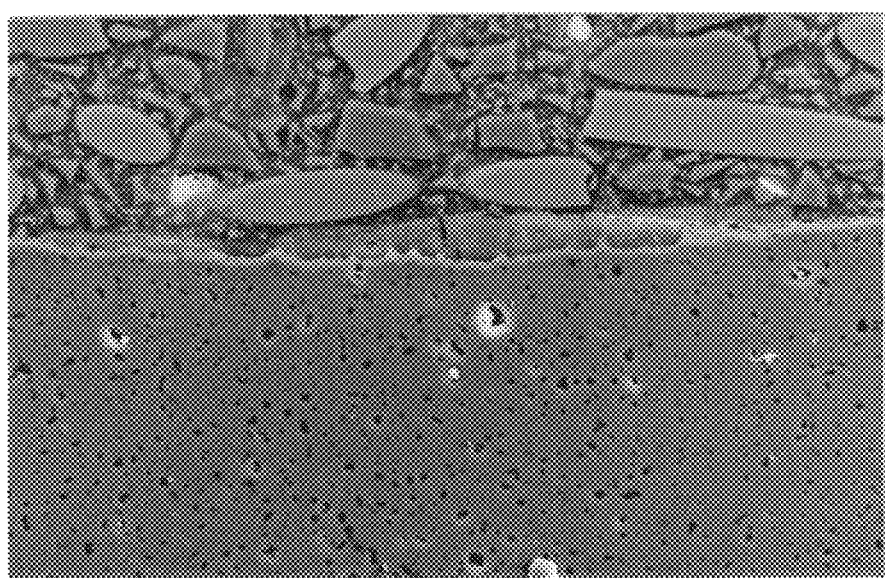
FIG. 8 shows a perpendicular section through the sliding surface of the sliding ring with the $SiO_2$ layer from FIG. 7. (Magnification: 500×)

FIG. 6 shows grain boundary corrosion to a depth of about 20 μm in the most highly stressed circumferential region of the sliding surface after a running time of 248 hours. Owing to the fine-grained microstructure, it encompasses a plurality of grain layers and thus leads to a loosening of the microstructure over a large area (cf. schematic depiction in FIG. 2). The loosened individual crystallites near the surface were forced into the sealing gap under loading and were ground in a tribochemical reaction to form Si-O-OH. After a running time of 500 hours, as can be seen in FIG. 7, there is formation of an SiO$_2$ layer on the sliding surface which leads to failure of the seal.

EXAMPLE 5

Result of further testing of sliding rings on a test bench.

The faces of the sliding rings from Example 2 were lapped in a customary manner to the required final dimensions using a loose diamond grit of <20 μm and these rings were used as test rings. The tests were carried out on a rotating mechanical seal test bench (from Burgmann) under the following conditions:

Pressure difference: 75 bar
Sliding speed: 8 m/s
Running time: 500 hours
Temperature of the medium: deionized water, 60° C.

The effects of the grain boundary corrosion were assessed ceramographically by means of optical microscopy.

Figure 9:
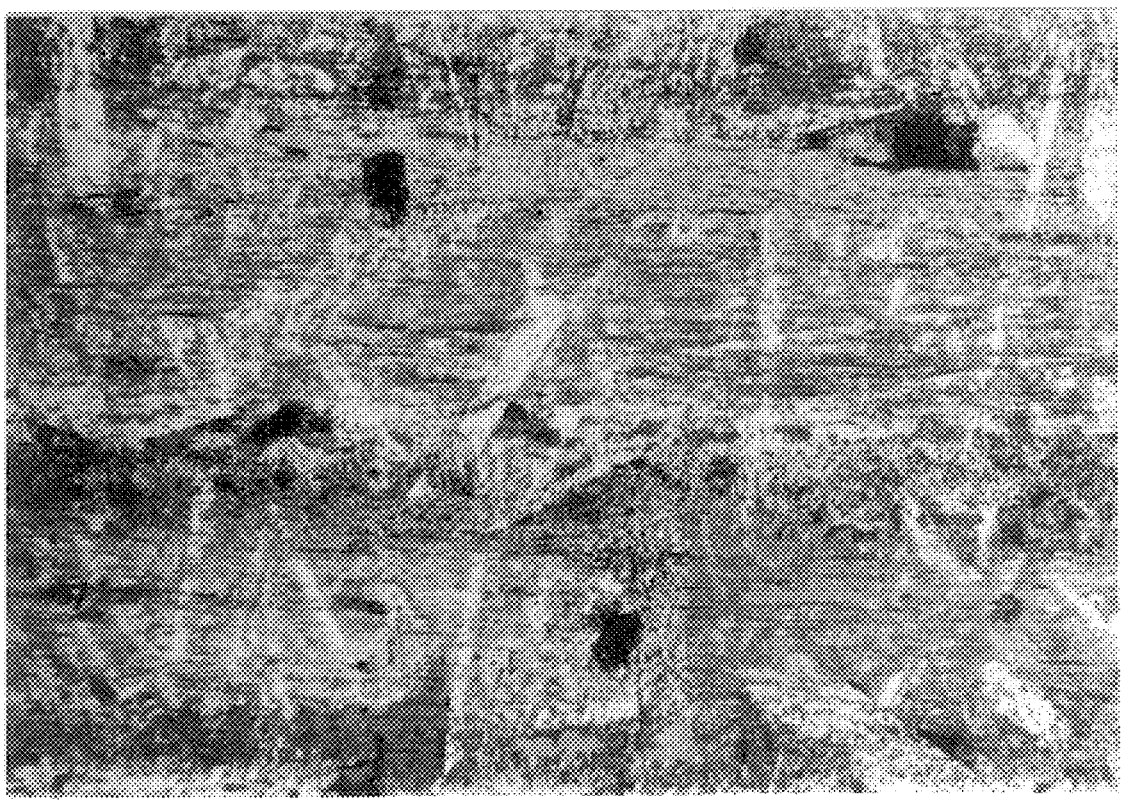
FIG. 9 shows the sliding surface of a sliding ring according to the invention containing graphite particles after a test bench run of 500 hours at 75 bar as described in Example 5. (Magnification: 100×)

Assessment of the sliding ring of the present invention as described in Example 2:

As shown in FIG. 9, the coarse-grained platelet structure with graphite particles having a size of 45–80 μm can also be clearly recognized in the sliding surface after the test bench run. In this case too, no formation of an SiO$_2$ layer on the sliding surface has taken place.

The results demonstrate the effectiveness of the coarsening of the microstructure according to the invention in the novel, bimodal SiC bearing material having a platelet microstructure in comparison with the conventional, fine-grained SiC bearing material.

What is claimed is:

1. A bearing material comprising a predominantly coarse-grained SiC matrix of pressureless sintered SiC a bimodal grain size distribution, wherein the bimodal grain size distribution is formed by from 50 to 90% by volume of prismatic, tabular SiC crystallites a length of from 100 to 1500 μm and from 10 to 50% by volume of prismatic, tabular SiC crystallites a length of from 5 to <100 μm.

2. An SiC bearing material as claimed in claim 1, wherein the bimodal grain size distribution is formed by from 60 to 90% by volume of prismatic tabular SiC crystallites having a length of from 100 to 1500 μm and from 10 to 40% by volume of prismatic, tabular SiC crystallites having a length of from 5 to <100 μm.

3. An SiC bearing material as claimed in claim 1 wherein the SiC crystallites comprise α-silicon carbide and up to 2%,by weight (total) of aluminum and/or boron.

4. An SiC bearing material as claimed in claim 2, wherein the SiC crystallites comprise α-silicon carbide and up to 2% by weight (total) of aluminum and/or boron.

5. An SiC bearing material as claimed in claim 1 which contains up to 5% by weight of carbon in the form of carbon black and/or graphite.

6. An SiC bearing material as claimed in claim 2 which contains up to 5% by weight of carbon in the form of carbon black and/or graphite.

7. An SiC bearing material as claimed in claim 3, which contains up to 5% by weight of carbon in the form of carbon black and/or graphite.

8. An SiC bearing material as claimed in claim 1 which contains specifically introduced pores and/or graphite particles.

9. An SiC bearing material as claimed in claim 2 which contains specifically introduced pores and/or graphite particles.

10. An SiC bearing material as claimed in claim 3 which contains specifically introduced pores and/or graphite particles.

11. An SiC bearing material as claimed in claim 4 which contains specifically introduced pores and/or graphite particles.

12. A SiC bearing material as claimed in claim 1 in the form of sealing rings in axial rotating mechanical seals in hot water applications when paired against itself.

13. A process for producing a bearing material as claimed in claim 1 which comprises shaping a finely divided α-SiC powder admixed with sintering aids and pressing aids and optionally pore formers by pressing to form green bodies, preheating the green bodies at temperatures up to 1000° C. in the presence of a protective gas atmosphere and subsequently sintering the preheated green bodies at temperatures from 2040° C. to 2090° C. until sintered bodies having a density of from 90% to 99% of the theoretical density of silicon carbide are formed, and subsequently heat treating the sintered bodies at a grain growth temperature of 2100°–2220° C. for 20–60 minutes until the microstructure is formed.

14. The process as claimed in claim 13 wherein sintering aids used are aluminum nitride and/or boron in amounts of up to 2% by weight.

15. The process as claimed in claim 13 wherein the sintering of the preheated green bodies is carried out at an absolute pressure of ≧30 mbar in the presence of an inert atmosphere.

16. The process as claimed in claim 14 wherein the sintering of the preheated green bodies is carried out at an absolute pressure of ≧30 mbar in the presence of an inert atmosphere.

* * * * *

UNITED STATES PATENT AND TRADEMARK OFFICE
CERTIFICATE OF CORRECTION

PATENT NO. : 5,939,185
DATED : August 17, 1999
INVENTOR(S) : Greim, et al

It is certified that error appears in the above-identified patent and that said Letters Patent is hereby corrected as shown below:

On the Title Page; the correct Assignee [73] should read:

--Elektroschmelzwerk Kempten GmbH
Munich, Federal Republic of Germany--

Claim 1, line 2; after "SiC" insert --with--
      line 5; after "crystallites" insert --with--
      line 7; after "crystallites" insert --with--

Signed and Sealed this

Thirtieth Day of May, 2000

Attest:

Attesting Officer

Q. TODD DICKINSON
Director of Patents and Trademarks